July 3, 1962     M. F. STEWART     3,042,235
FRONT-LOADING POWER SHOVEL
Filed Sept. 28, 1960     2 Sheets-Sheet 1
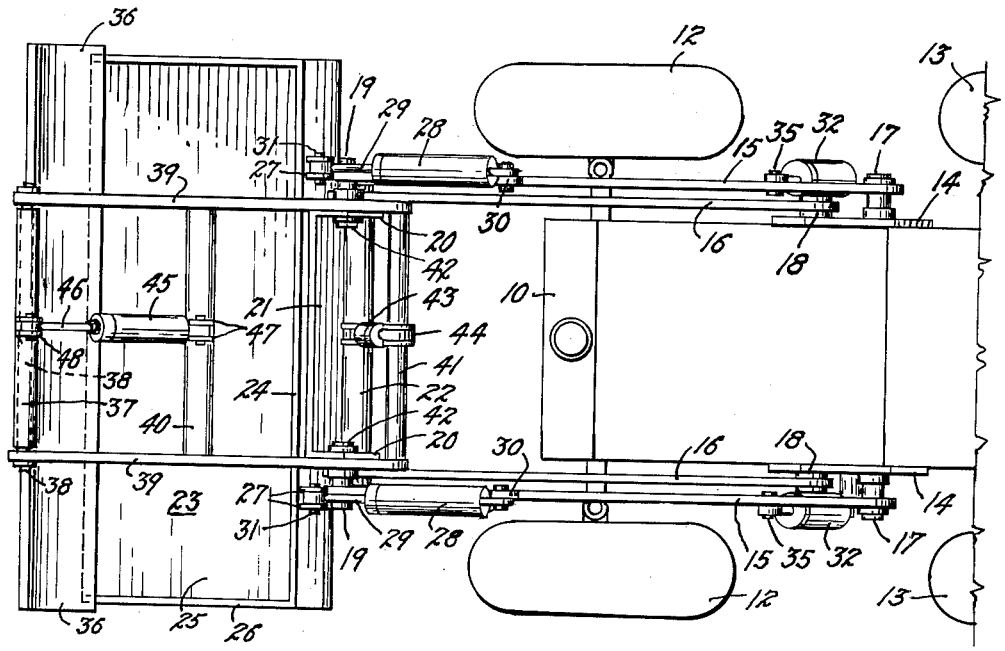
Fig. 1
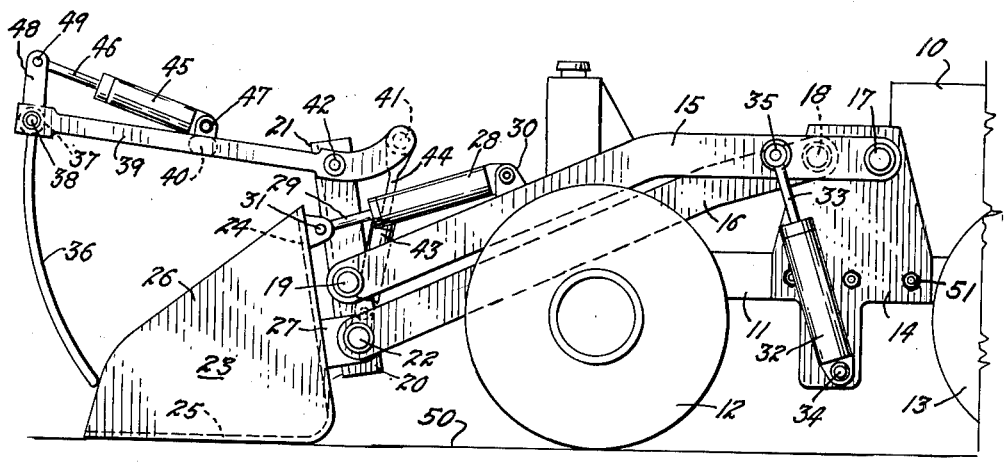
Fig. 2
INVENTOR.
Merlin F. Stewart
BY 
ATTORNEY July 3, 1962 M. F. STEWART 3,042,235
FRONT-LOADING POWER SHOVEL
Filed Sept. 28, 1960 2 Sheets-Sheet 2
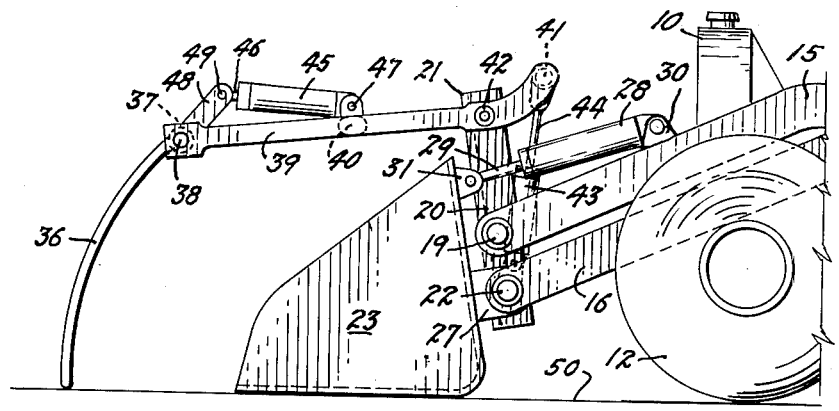
Fig. 3
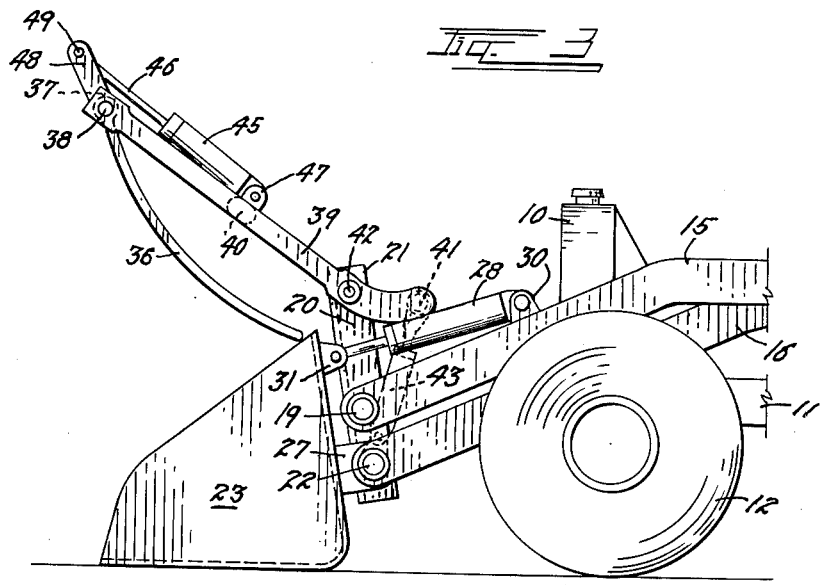
Fig. 4
INVENTOR.
Merlin F. Stewart
BY
ATTORNEY United States Patent Office 3,042,235
Patented July 3, 1962

3,042,235
FRONT-LOADING POWER SHOVEL
Merlin F. Stewart, Box 447, Center, Colo.
Filed Sept. 28, 1960, Ser. No. 58,944
4 Claims. (Cl. 214—145)

The invention relates to a front-loading power shovel for tractor-type vehicles and more particularly to a loading, scraping and sweep blade or gate for front-loading power shovels of the type known as "tractor loaders."

It is often desirable, such as when handling concrete aggregate or when working on excavating contracts based upon cubic yardage, to have some means to accurately measure the cubic contents of loads being handled by power shovels. Such accuracy is difficult with the usual power shovel due to the fact that some materials will pile or heap in the shovel to such an extent that the rated cubic capacity of the shovel is greatly exceeded.

The principal object of the invention is to provide a highly efficient, manipulatable, power-actuated, scraper-like blade for a power shovel which can be actuated to sweep over the load in the shovel to accurately level the load to the cubic capacity of the shovel.

Another object of the invention is to provide a power-actuated sweep blade which can be projected forwardly of the shovel into a pile or bank of material so as to break down and sweep the material rearwardly into the shovel.

A further object is to provide a power-actuated sweep blade for a front-loading power shovel which can be used as a gate to hold material in or on the shovel.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a plan view of the improved tractor-mounted, forward-loading power shovel showing it in place upon a conventional tractor;

FIG. 2 is a left side elevational view of the shovel of FIG. 1; and

FIGS. 3 and 4 are similar side elevational views showing various operating positions of the shovel and the improved loading, scraping and sweeping blade thereon.

In the drawing, a ground line is indicated at 50 and a conventional tractor is indicated at 10 with its chassis at 11, its front wheels at 12 and its rear wheels at 13. The tractor may be of any suitable type, either wheeled or provided with caterpillar treads and is preferably, but not necessarily, of a type having a self-contained hydraulic system.

In applying this invention, a chassis side plate 14 is attached to each side of the chassis 11 by means of suitable attachment bolts 51. The plates 14 project upwardly and downwardly from the chassis and each is provided adjacent its upper extremity with a rear pivot stud 17 and a forward pivot stud 18. An upper-outer shovel arm 15 is pivotally mounted at its rear extremity upon each rear pivot stud 17 and a lower-inner shovel arm 16 is similarly pivoted at its rear extremity on each forward pivot stud 18. The shovel arms 15 and 16 extend forwardly of the tractor at each side thereof.

The forward extremities of the two upper-outer shovel arms 15 are pivotally mounted on upper pivot studs 19 which project oppositely outward from each of two side flanges 20 on a channel-shaped shovel frame plate 21. The forward extremities of the two lower-inner shovel arms 16 are pivotally mounted on the opposite extremities of a frame shaft 22 which extends between and projects oppositely outward from the side flanges 20 of the shovel frame plate 21.

A scoop-shaped shovel 23 having a rear wall 24, a bottom 25 and two end walls 26, having upwardly and rearwardly inclined upper edges, is positioned forwardly of the frame plate 21 and is pivotally mounted on the projecting extremities of the frame shaft 22 through the medium of suitable mounting ears 27 which are welded or otherwise secured to and project rearwardly from the rear shovel wall 24.

The shovel 23 is arranged to be swung to any desired angular position about the axis of the frame shaft 22 by means of a first pair of double-acting hydraulic cylinders 28, there being one of the cylinders 28 mounted on a mounting ear 30 on each of the upper-outer shovel arms 15 and having its plunger 29 extending forwardly to a mounting clip 31 on the rear shovel wall 24.

The shovel 23 can be raised and lowered by means of a second pair of double-acting hydraulic cylinders 32, there being one of the cylinders 32 mounted on a pivot stud 34 adjacent the bottom of each chassis side plate 14 with its plunger 33 connected to a crank pin 35 on the upper-outer shovel arm 15 thereabove.

It can be seen from the above description that by admitting hydraulic fluid to the second pair of cylinders 32, the shovel arms 15 and 16, the shovel frame plate 21, and the shovel 23 may be elevated to any desired height and by admitting hydraulic fluid to the first pair of hydraulic cylinders 28, the shovel may be tilted forwardly to a dumping position.

The improved sweep gate comprises a curvated, metallic gate plate 36 of greater width than the width of the shovel 23. A medial hinge tube 37 is welded to or otherwise formed on the upper edge of the gate plate 36 by means of which the gate plate is swingingly suspended from a hinge shaft 38 extending between the forward extremities of two similar gate arms 39. The gate arms 39 are maintained in rigid parallel relation by means of a forward cross member 40 and a rear cross member 41. The cross members 40 and 41 are welded at their extremities to the gate arms 39 to provide a rigid gate-supporting frame. The gate arms are pivotally mounted adjacent their rear extremities upon suitable pivots 42 mounted in the upper extremities of the side flanges 20 of the shovel frame plate 21.

The gate arms 39 and the suspended gate plate 36 can be raised and lowered relative to the shovel 23 by means of a fifth hydraulic cylinder 43 which is pivotally mounted upon the frame shaft 22 and provided with a hydraulically-actuated plunger 44 extending upwardly to a pivotal connection with the rear cross member 41 of the gate frame.

The gate plate 36 can be swung forward and back about the axis of the hinge shaft 38 through the medium of a sixth double-acting hydraulic cylinder 45 which is tiltably mounted at its rear extremity in a mounting clip 47 on the forward cross member 40 and which is provided with a hydraulic plunger 46 which is pivotally connected, as shown at 49, to a swing lever 48 welded to and projecting upwardly from the hinge tube 37.

It can be seen that if hydraulic fluid be admitted to the rear of the sixth hydraulic cylinder 45, the lower edge of the gate plate 36 will be caused to swing rearwardly so as to slide rearwardly and upwardly on the inclined upper edges of the shovel end walls 26, as shown in FIGS. 2 and 4. If fluid be admitted to the forward portion of the sixth cylinder 45, the lower edge of the gate plate 36 will be swung forwardly, as shown in FIG. 3, and, by simultaneously admitting fluid to the upper portion of the hydraulic cylinder 43, the gate plate can be simultaneously swung upwardly as it moves forward.

While in the embodiment illustrated, pairs of hydraulic cylinders have been shown for lifting and tilting the shovel and single hydraulic cylinders have been shown for lifting and swinging the gate plate, it is to be understood the number of cylinders employed for each purpose will be dependent on the size of the particular installation and the work that is to be accomplished. Since it is customary, with all similar hydraulic installations, to employ hydraulic pipes, hoses and valves, the latter equipment has, for the purpose of clarity of illustration, been omitted from the drawings.

While a specific form of the improvement has been described and illustrated herein, it is to be understood that the same may be varied within the scope of the appended claims, without departing from the spirit of the invention.

Having thus described the invention, what is claimed and desired to be secured by Letters Patent is:

1. A front loading shovel for a powered vehicle comprising: a scoop-shaped shovel; means for mounting said shovel forwardly of said vehicle; means for raising and lowering said shovel relative to said vehicle; a shovel frame mounted rearwardly of said shovel so as to move vertically therewith; a first pivot means on and adjacent the top of said shovel frame, a pair of gate arms mounted on said first pivot means and extending forwardly therefrom in spaced relation; a second pivot means on and adjacent the forward extremities of said gate arms; a gate plate pivotally suspended from said second pivot means between the forward extremities of said gate arms; first operating means connected with said gate arms for swinging the latter vertically about the axis of said first pivot means; and a second independently-operated operating means connected with said gate plate for swinging the latter horizontally about the axis of said second pivot means.

2. A front loading shovel as described in claim 1 in which the first operating means comprises: an extension on each gate arm extending rearwardly from the first pivot means; a rear cross member affixed to and extending between said extensions; and hydraulic means connected with said cross bar for raising and lowering the latter so as to raise and lower the second pivot means.

3. A front loading shovel as described in claim 1 in which the second operating means comprises: a forward cross member affixed to and extending between said gate arms forwardly of said first pivot means; a swing lever projecting upwardly from said sweep plate above said second pivot means; and hydraulic means interconnected between said swing lever and said forward cross member for swinging the bottom said sweep plate forward and back about the axis of said second pivot means independently of its raising and lowering movements about the axis of said second pivot means.

4. A front loading shovel as described in claim 1 having upwardly and rearwardly contoured end plates on said shovel, said gate plate having a greater width than said shovel so as to overlap and ride upwardly and rearwardly on said end plates in consequence of the contour of the latter as said sweep plate is swung rearwardly at its bottom by said second operating means.

References Cited in the file of this patent

UNITED STATES PATENTS

| | | |
|---|---|---|
| 2,412,323 | Conrad | Dec. 10, 1946 |
| 2,537,010 | Andersen | Jan. 9, 1951 |
| 2,795,872 | Wardle | June 18, 1957 |
| 2,870,925 | Bernad et al. | Jan. 27, 1959 |
| 2,958,434 | Wagner | Nov. 1, 1960 |
| 2,997,193 | Dunham | Aug. 22, 1961 |